(12) United States Patent
Hazama (10) Patent No.: US 6,266,515 B1
(45) Date of Patent: Jul. 24, 2001

(54) COMMUNICATION TERMINAL EQUIPPED WITH A PRESS-TO-TALK SWITCH FOR AUTOMATIC TRANSMISSION

(75) Inventor: Kaori Hazama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/105,089

(22) Filed: Jun. 26, 1998

(30) Foreign Application Priority Data

Jan. 20, 1998 (JP) .................................................. 10-009143

(51) Int. Cl.[7] .................................................. H04B 1/38
(52) U.S. Cl. .............................................. 455/78; 455/517
(58) Field of Search ........................... 455/76–79, 161.1, 455/161.2, 165.1, 166.1, 186.1, 166.2, 32.1, 58, 221, 83, 218, 212, 80, 517, 518, 519, 520, 521; 370/24, 32, 31; 340/825.07, 825.44, 825.5, 825.81, 825.82

(56) References Cited

U.S. PATENT DOCUMENTS

| | | | |
|---|---|---|---|
| 4,501,017 | * | 2/1985 | Higgins et al. ........................ 455/78 |
| 4,979,231 | * | 12/1990 | Johnson et al. ........................ 455/58 |
| 4,982,441 | * | 1/1991 | Hashimoto et al. .................... 455/34 |
| 5,247,703 | * | 9/1993 | Englert et al. ......................... 455/77 |
| 5,287,549 | * | 2/1994 | Roehrs et al. ....................... 455/35.1 |
| 5,475,683 | * | 12/1995 | Harrison et al. ..................... 370/68.1 |
| 5,568,511 | * | 10/1996 | Lampe ................................. 375/211 |
| 5,850,611 | * | 12/1998 | Krebs .................................. 455/518 |
| 5,864,762 | * | 1/1999 | Childress et al. .................... 455/509 |

FOREIGN PATENT DOCUMENTS

| | | | | |
|---|---|---|---|---|
| 21161342A | * | 1/1986 | (GB) .............................. H04R/3/12 |
| 405175878A | * | 9/1983 | (JP) ............................. H04B/011/44 |
| 60062733A2 | * | 9/1983 | (JP) ............................. H04B/001/40 |
| 360062733A | * | 1/1985 | (JP) ............................. H04B/001/46 |
| 62001398A2 | * | 6/1985 | (JP) ............................. H04Q/003/58 |

* cited by examiner

Primary Examiner—Daniel Hunter
Assistant Examiner—Pablo Tran
(74) Attorney, Agent, or Firm—Rothwell, Figg, Ernst & Manbeck (57) ABSTRACT

To simplify the operation of a press-to-talk switch, transmission is continued for a set time by an operation relief control unit even when the press-to-talk switch is released after transmission effected by pressing the press-to-talk switch.

5 Claims, 10 Drawing Sheets

COMMUNICATION TERMINAL EQUIPPED WITH A PRESS-TO-TALK SWITCH FOR AUTOMATIC TRANSMISSION

BACKGROUND OF THE INVENTION

1. Field of the Invention

This invention relates to a communication terminal equipped with a press-to-talk switch.

2. Description of the Prior Art

Communication services for transmitting information by various means have recently been made available owing to marked progress in mobile radio communication. For instance, a communication terminal equipped with a press-to-talk switch enables an operator to receive a communication service from a base station or other station by selecting a desired channel in order to acquire various information on a real-time basis and press the press-to-talk switch only when he/she requests transmission. Therefore, this is very convenient especially when the operator is engaged in complicated operation or carrying the terminal.

Figure 9:
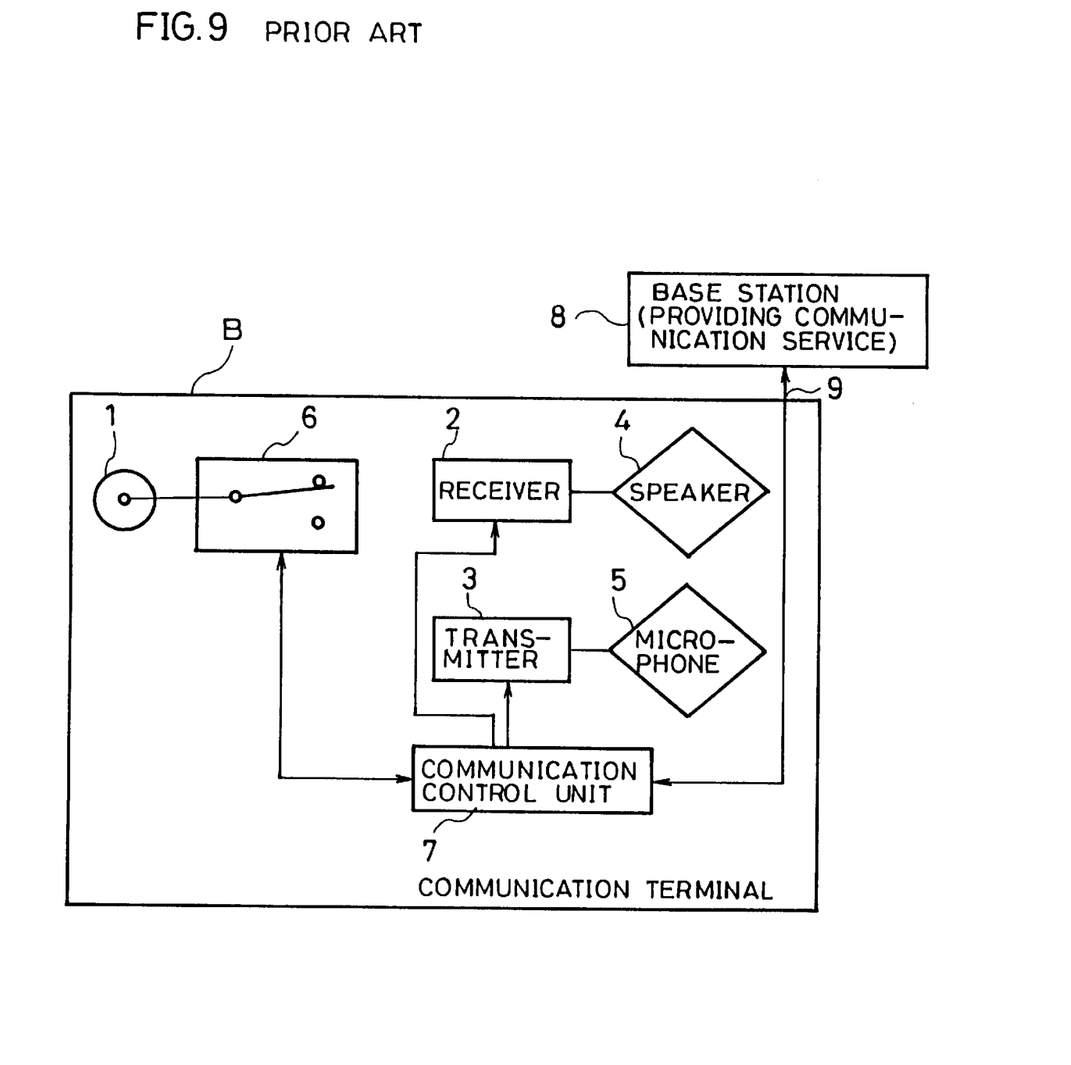
FIG. 9 is a block diagram of a communication terminal of the prior art.

FIG. 9 is a block diagram of a communication terminal B of the prior art. In FIG. 9, reference numeral 1 is a press-to-talk switch which is pressed or released by the operator, 2 a receiver for controlling a speaker 4, 3 a transmitter for controlling a microphone 5, 6 a press-to-talk switch detection unit for detecting whether the press-to-talk switch 1 is pressed or not, 7 a communication control unit for controlling the receiver 2 and the transmitter 3 in accordance with detection information from the press-to-talk switch detection unit 6 and information from a base station 8, 8 the base station for providing a communication service to the communication terminal B, and 9 channels between the base station 8 and the communication terminal B. The press-to-talk switch 1, receiver 2, transmitter 3, speaker 4, microphone 5, press-to-talk switch detection unit 6 and communication control unit 7 are provided within the communication terminal B.

A description is given of the operation of the communication terminal B of the prior art. When the communication terminal B receives a communication service from the base station 8, the communication control unit 7 activates the receiver 2 to receive signals from the base station over a channel 9. Thereby, a voice from the base station 8 is received and output from the speaker 4. When the communication terminal B requests transmission over a channel 9, the operator presses the press-to-talk switch 1, and the press-to-talk switch detection unit 6 detects it and informs the communication control unit 7 of it. Thereby, the communication control unit 7 activates the transmitter 3 and stops the operation of the receiver 2. At the same time, the communication control unit 7 carries out processing for transmission to the base station 8. Thereby, the output of a voice from the base station 8 through the speaker 4 is stopped and a voice from the microphone 5 is transmitted and output to the base station 8. When the operator stops pressing the press-to-talk switch 1 to release the press-to-talk switch 1, the press-to-talk switch detection unit 6 detects it and informs the communication control unit 7 of it. Thereby, the communication control unit 7 stops the operation of the transmitter 3 and re-activates the receiver 2. At the same time, the communication control unit 7 carries out processing for the termination of transmission to the base station 8. Thereby, a voice from the base station 8 is received and output from the speaker 4 again. Thus, the communication terminal B of the prior art is switched between transmission and reception each time the press-to-talk switch 1 is pressed and released. The press-to-talk switch 1 must be kept pressed while transmission is continued.

Figure 10:
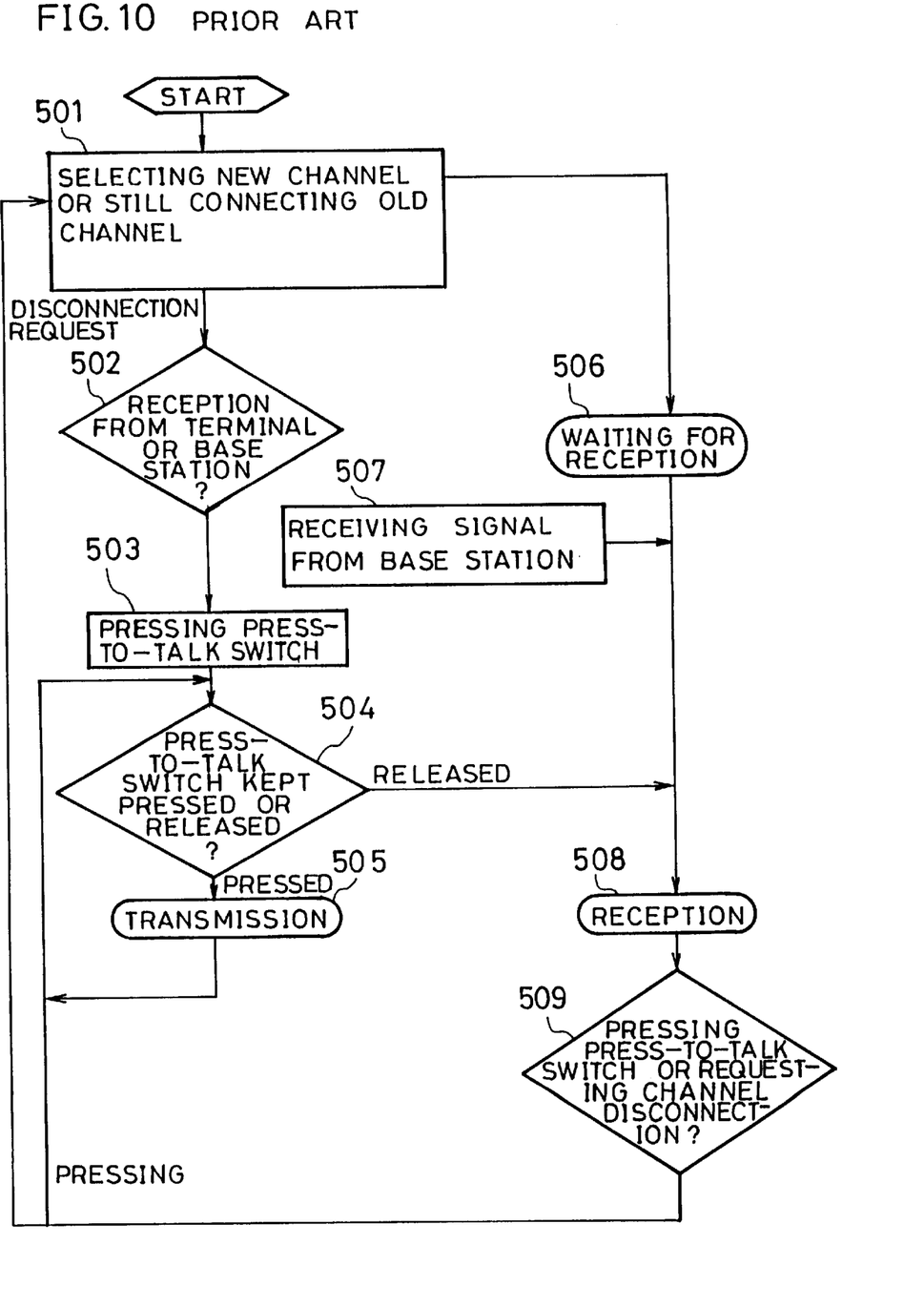
FIG. 10 is a flow chart for communication processing in the prior art.

FIG. 10 is a flow chart showing operation procedure from the selection of a desired channel by the communication terminal B of the prior art to the disconnection of the channel. With reference to FIG. 10, complicated operation when a plurality of channels are used will be described. The operator first selects a desired one from the plurality of channels and sets it in the communication terminal B (see step 501). The channel number inputting function and scanning function of the communication terminal B are used to select and set the desired channel in the communication terminal B. This is a first operation. When the operator requests to connect his/her own communication terminal B to his/her desired channel in this state, he/she presses the press-to-talk switch 1 (see steps 502 and 503). Thereby, the communication terminal B carries out the connection of the channel. When the press-to-talk switch 1 is kept pressed after the connection, the communication terminal B is switched to transmission (steps 504 and 505). These are second and third operations.

On the other hand, to receive signals by connecting a desired channel, the operator selects his/her desired channel and waits for signals from the base station 8 over the channel (see steps 501 and 506). After the reception of the signals, the communication terminal B is connected to the channel. Thereby, the communication terminal B is switched to reception (see step 508). When the operator wants to transmit signals, he/she keeps pressing the press-to-talk switch 1 to switch the communication terminal B from reception to transmission so that transmission can be continued (see steps 509, 504 and 505). This is also a second operation. When the operator wants to terminate transmission and return to reception in this state, he/she releases the press-to-talk switch 1 to switch the communication terminal B from transmission to reception. Thus, transmission is terminated and reception is resumed (see steps 504 and 508). This is a fourth or third operation after transmission. Thereafter, when the operator wants to terminate communication or select another desired channel by disconnecting the connected channel, he/she makes a channel connection request. Thereby, the communication terminal B returns to the initial channel selection state (see steps 509 and 501). Thus, the communication terminal B of the prior art requires several operations such as pressing, keeping pressing and releasing of the press-to-talk switch 1 for the process from the selection of a desired channel to the disconnection of the channel. The same operations are required especially for emergency communication.

The case where the communication terminal of the prior art receive signals from an old channel and cannot select a new channel when the operator wants to select the new channel after the disconnection of the old channel will be described with reference to FIG. 10. When the currently connected channel is to be disconnected and a new channel is to be selected, the currently connected channel is selected in the communication terminal B as shown in steps 509 and 501. In this state, the operator operates the communication terminal B to select a new channel. However, as described above, the state where the communication terminal B selects a channel is also a state where the communication terminal waits for reception as shown in steps 501 and 506. Therefore, when the communication terminal B receives signals from the base station 8 over the connected channel, the communication terminal B is connected to the channel. Therefore, the operation of selecting a new channel is interrupted and the communication terminal B is switched to reception. In the communication terminal B of the prior art, the selection of a channel is interrupted to improve the connection rate of channels and a channel cannot be selected freely, resulting in complicated operation.

The communication terminal B equipped with the press-to-talk switch 1 of the prior art requires several operations of the press-to-talk switch 1 for the process from the selection of a desired channel to the disconnection of the channel and for the selection of a new channel after the connection of a channel as described above. In addition, these operations are complicated. Therefore, when the communication terminal B is used while the operator is engaged in complicated operation or carrying it, its operation is complicated.

SUMMARY OF THE INVENTION

It is an object of the present invention which has been made in view of the above problems of the prior art to provide a communication terminal which can be operated with ease.

According to a first aspect of the present invention, there is provided a communication terminal equipped with a press-to-talk switch which is pressed by an operator when he/she transmits signals after the selection and connection of his/her desired channel, wherein the device has automatic transmission continuation means for keeping transmission for a predetermined time even when the press-to-talk switch is released after transmission is carried out by pressing the press-to-talk switch.

According to a second aspect of the present invention, there is provided a communication terminal which has automatic transmission set time changing means for changing the set time of the automatic transmission continuation means.

According to a third aspect of the present invention, there is provided a communication terminal which has automatic transmission extension means for continuing transmission while the press-to-talk switch is kept pressed even after the set time of automatic transmission by keeping pressing the press-to-talk switch during automatic transmission effected by the automatic transmission continuation means of the first aspect.

According to a fourth aspect of the present invention, there is provided a communication terminal which has automatic transmission interrupting means for interrupting automatic transmission by pressing and releasing the press-to-talk switch again while automatic transmission is effected by the automatic transmission continuation means of the first aspect.

According to a fifth aspect of the present invention, there is provided a communication terminal equipped with a press-to-talk switch which is pressed to transmit signals after a desired channel is selected and connected, the device having one-touch means for carrying out the selection of a desired channel through the termination of transmission with a single operation.

According to a sixth aspect of the present invention, there is provided a communication terminal equipped with a press-to-talk switch which is pressed to transmit signals after a desired channel is selected and connected, the device having new channel preferential connection means for carrying out the selection and connection of a new channel and rejecting reception over an old channel when a new channel is to be selected and connected after the disconnection of the old channel.

The above and other objectives, features and advantages of the invention will become more apparent from the following description when taken in conjunction with the accompanying drawings.

DETAILED DESCRIPTION OF THE PREFERRED EMBODIMENTS

Embodiment 1

Figure 1:
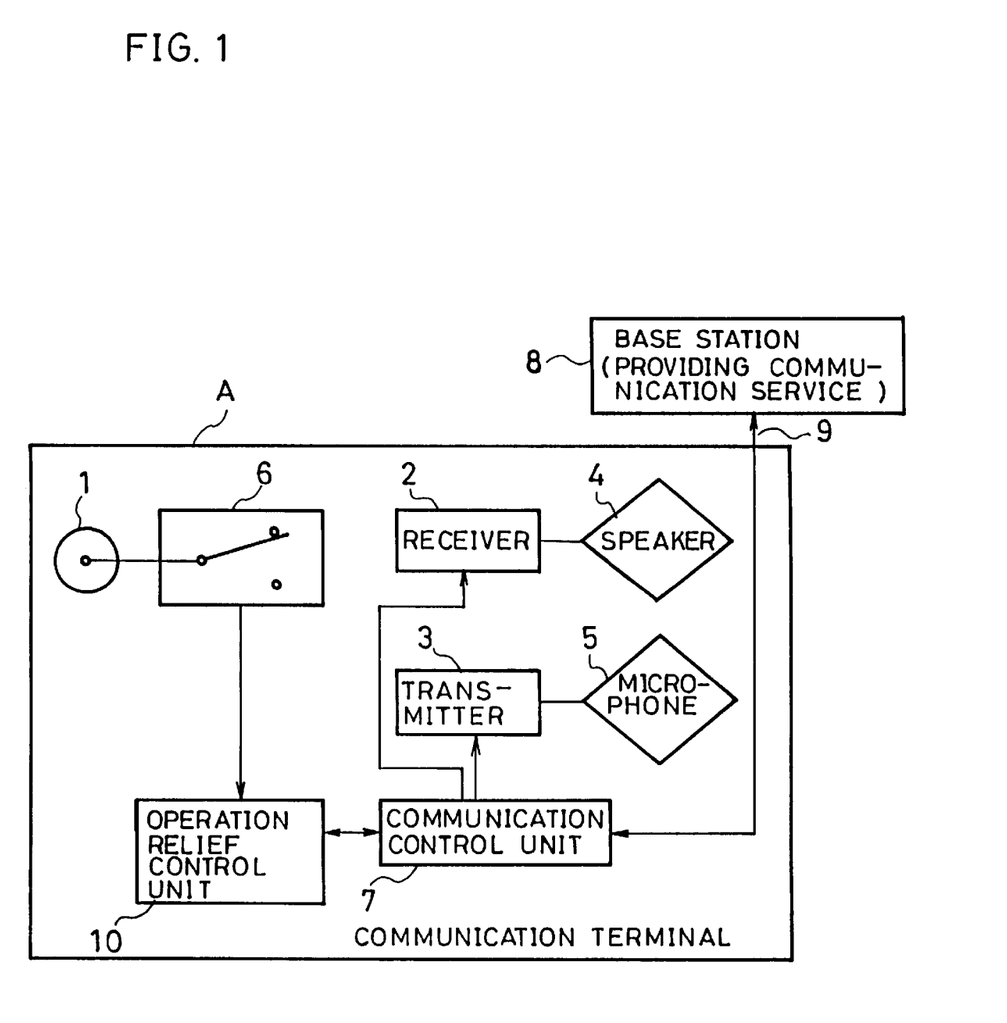
FIG. 1 is a block diagram of a communication terminal according to Embodiment 1 of the present invention.
Figure 2:
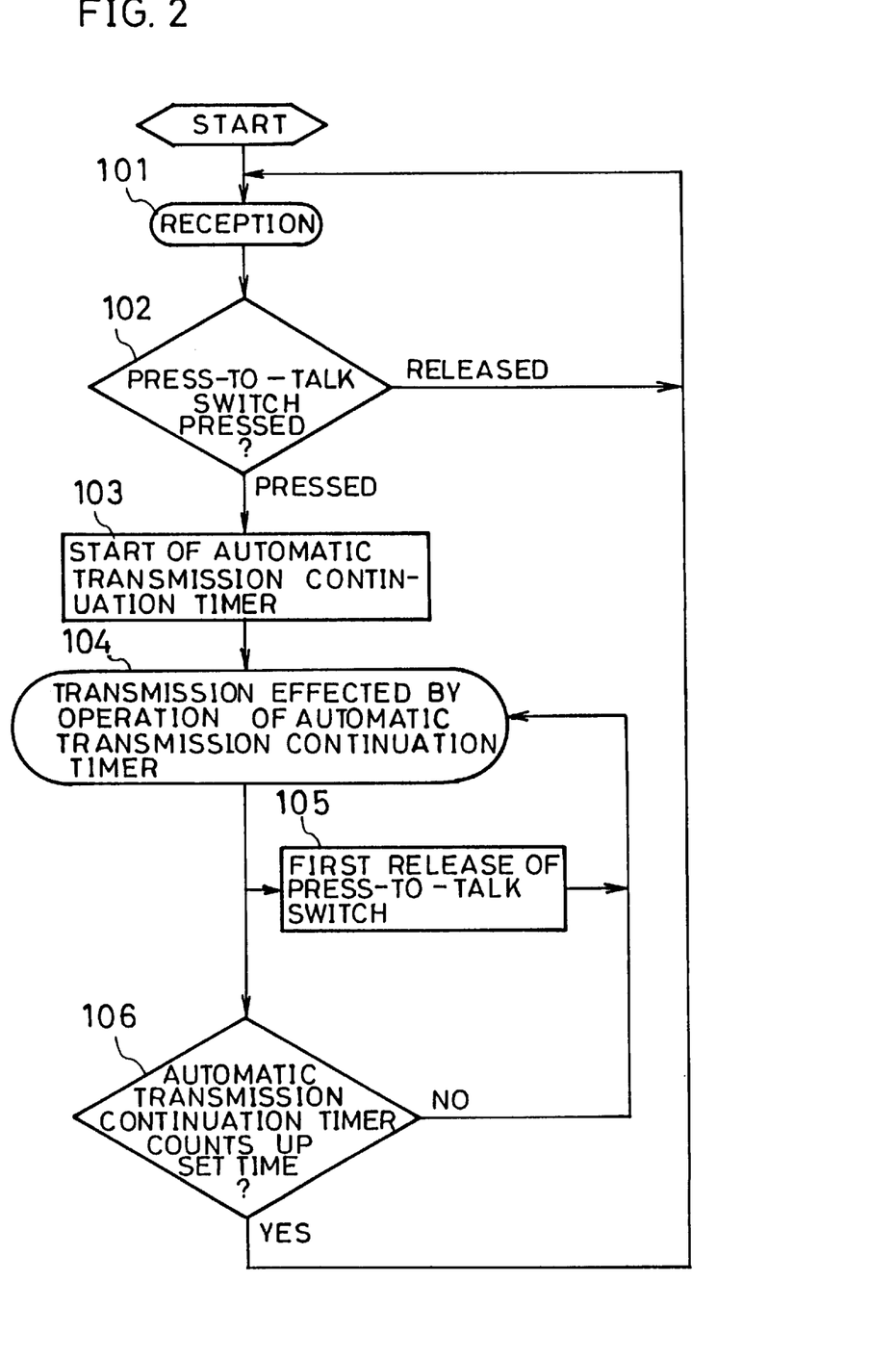
FIG. 2 is a flow chart for communication processing in Embodiment 1 of the present invention.

FIG. 1 is a block diagram of a communication terminal A according to Embodiment 1 of the present invention. FIG. 2 is a flow chart of operation procedure in Embodiment 1 of the present invention.

In FIG. 1, the communication terminal A comprises a press-to-talk switch 1, receiver 2, transmitter 3, speaker 4, microphone 5, press-to-talk switch detection unit 6 and communication control unit 7 like the prior art and the base station 8 and the channels 9 are the same as those of the prior art. In this Embodiment 1 of the present invention, the communication terminal A has therein an operation relief control unit 10 which processes detection information from the press-to-talk switch detection unit 6 and reception information from the base station 8 and outputs only effective signals to the communication control unit 7. The operation relief control unit 10 has an automatic transmission continuation timer as automatic transmission continuation means for setting a time during which automatic transmission is continued.

A description is subsequently given of the operation of this Embodiment 1 of the present invention. To request transmission from the communication terminal A to the base station 8 over a selected channel, the operator presses the press-to-talk switch 1, and the press-to-talk switch detection unit 6 detects that the press-to-talk switch 1 has been pressed and informs the operation relief control unit 10 of it. The operation relief control unit 10 judges that information from the press-to-talk switch detection unit 6 is a press-to-talk switch 1 press signal for switching from reception to transmission and informs the communication control unit 7 of the start of transmission. Based on this information, the communication control unit 7 activates the transmitter 3, stops the operation of the receiver 2 and carries out processing for transmission to the base station 8 at the same time.

The operation of the operation relief control unit 10 will be described with reference to the flow chart of FIG. 2. When the operation relief control unit 10 receives information on switching from reception to transmission and the start of transmission from the press-to-talk switch detection unit 6 during reception in step 101, it judges that the press-to-talk switch 1 has been pressed in step 102 and starts the automatic transmission continuation timer in step 103, whereby transmission is continued for a time set in the automatic transmission continuation timer in step 104. Therefore, voice output from the base station 8 through the speaker 4 is stopped, voice input from the microphone 5 is output to the base station 8, and the automatic transmission continuation function of the operation relief control unit 10 of the communication terminal A is started.

Thereafter, when the press-to-talk switch 1 is released, the press-to-talk switch detection unit 6 detects that the press-to-talk switch 1 has been released and informs the operation relief control unit 10 of it. However, the operation relief control unit 10 judges that a signal from the press-to-talk switch detection unit 6 is a first press-to-talk switch 1 release signal during transmission effected by the operation of the automatic transmission continuation timer in step 105 before the automatic transmission continuation timer counts up the set time in step 106 and abandons the signal. Thereby, the termination of transmission is not informed of the communication control unit 7 from the operation relief control unit 10, and the communication control unit 7 does not carry out processing for the termination of transmission to the base station 8. Therefore, the connection of the selected channel 9 with the base station 8 and the operation of the transmitter 4 within the communication terminal A are maintained to continue transmission.

According to this Embodiment 1 of the present invention, when the press-to-talk switch 1 is pressed once by the operator, the automatic transmission continuation timer of the operation relief control unit 10 is started and transmission is continued even when the press-to-talk switch 1 is released by the operator before the automatic transmission continuation timer counts up the set time. Therefore, the operator does not need to keep pressing the press-to-talk switch 1 during transmission.

Embodiment 2

Figure 3:
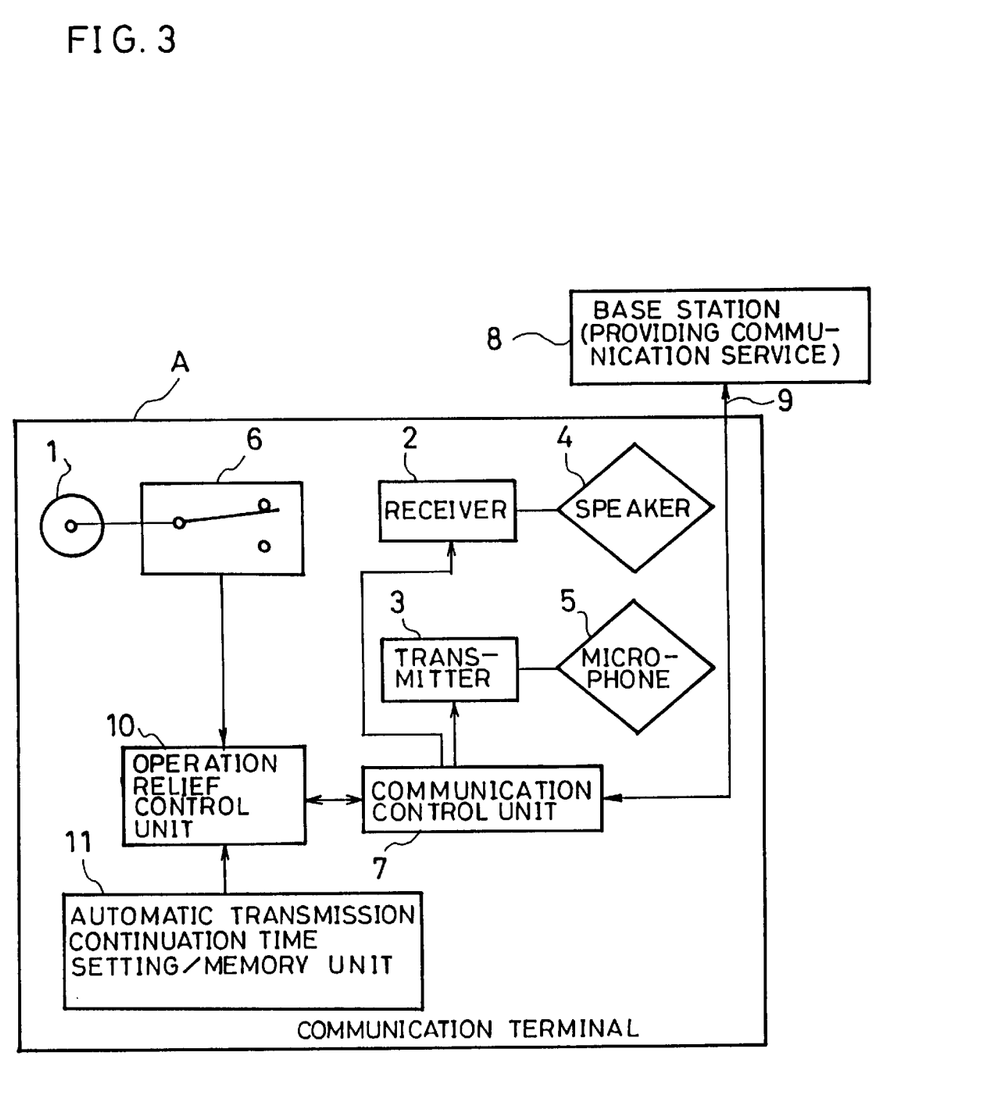
FIG. 3 is a block diagram of a communication terminal according to Embodiment 2 of the present invention.

While the automatic transmission continuation time of the automatic transmission continuation timer is a predetermined time value in the above Embodiment 1 of the present invention, as shown in FIG. 3, this Embodiment 2 is characterized in that the operator can set the automatic transmission continuation time of the timer to a desired value.

FIG. 3 is a block diagram of a communication terminal A according to this Embodiment 2 of the present invention. In FIG. 3, reference numeral 11 denotes an automatic transmission continuation time setting/memory unit as automatic transmission set time changing means which functions to set an automatic transmission continuation time and store it by the operation of the operator. That is, the automatic transmission continuation time setting/memory unit 11 enables the operator to set the automatic transmission continuation time of the automatic transmission continuation timer to any desired value and stores the set value.

Therefore, according to this Embodiment 2 of the present invention, since the operator operates the automatic transmission continuation time setting/memory unit 11 to set the automatic transmission continuation time to a desired value, he/she can change an automatic transmission continuation time preset in the operation relief control unit 10 and automatic transmission continuation which does not require the operator to keep pressing the press-to-talk switch 1 is made possible.

Embodiment 3

Figure 4:
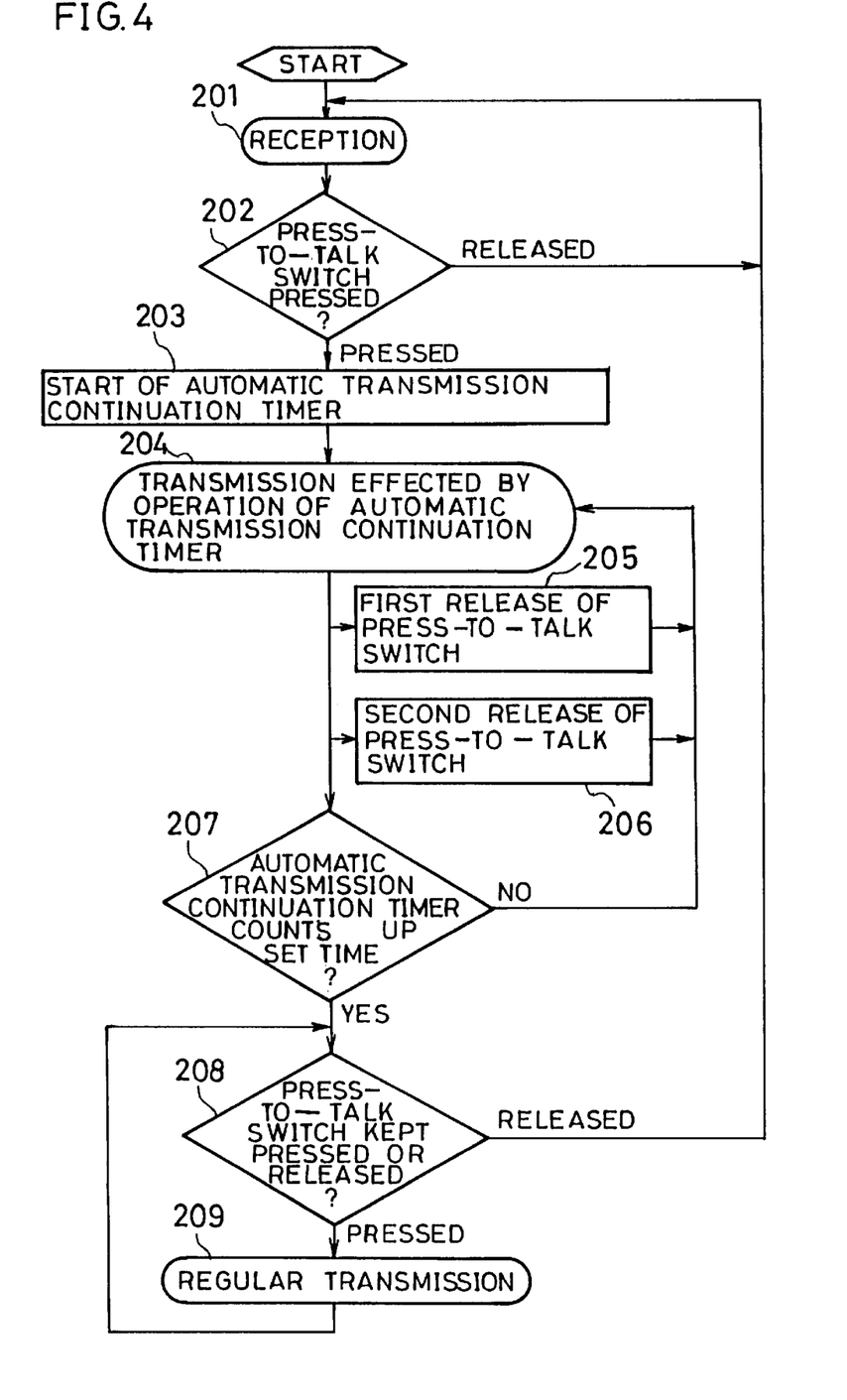
FIG. 4 is a flow chart for communication processing in Embodiment 3 of the present invention.

While the automatic transmission continuation time can be changed by the operator in the above Embodiment 2 of the present invention, as shown in FIG. 4, Embodiment 3 of the present invention is characterized by automatic transmission extension means which enables the operator to continue transmission by keeping pressing the press-to-talk switch 1 before and after the automatic transmission continuation timer counts up the set time.

FIG. 4 is a flow chart of the processing of extending automatic transmission continuation by the operation relief processing unit 10 in this Embodiment 3 of the present invention. In FIG. 4, steps 201 to 205 are the same as steps 101 to 105 in FIG. 2. When the operator presses the press-to-talk switch 1 again during transmission effected by the operation of the automatic transmission continuation timer in step 206 and keeps pressing the press-to-talk switch 1 after the automatic continuation timer counts up the set time in step 207 (the same as step 106 in FIG. 2), it is judged that the press-to-talk switch 1 is kept pressed or released in step 208. When the press-to-talk switch 1 is kept pressed, regular transmission is continued while the automatic transmission continuation timer is in operation in step 209. When the press-to-talk switch 1 is released, the communication terminal A is switched to reception in step 201.

According to this Embodiment 3 of the present invention, regular transmission can be continued while the press-to-talk switch 1 is kept pressed when the press-to-talk switch 1 is kept pressed from before the passage of the automatic transmission continuation time set in the automatic transmission continuation timer till after the passage of the automatic transmission continuation time.

Embodiment 4

Figure 5:
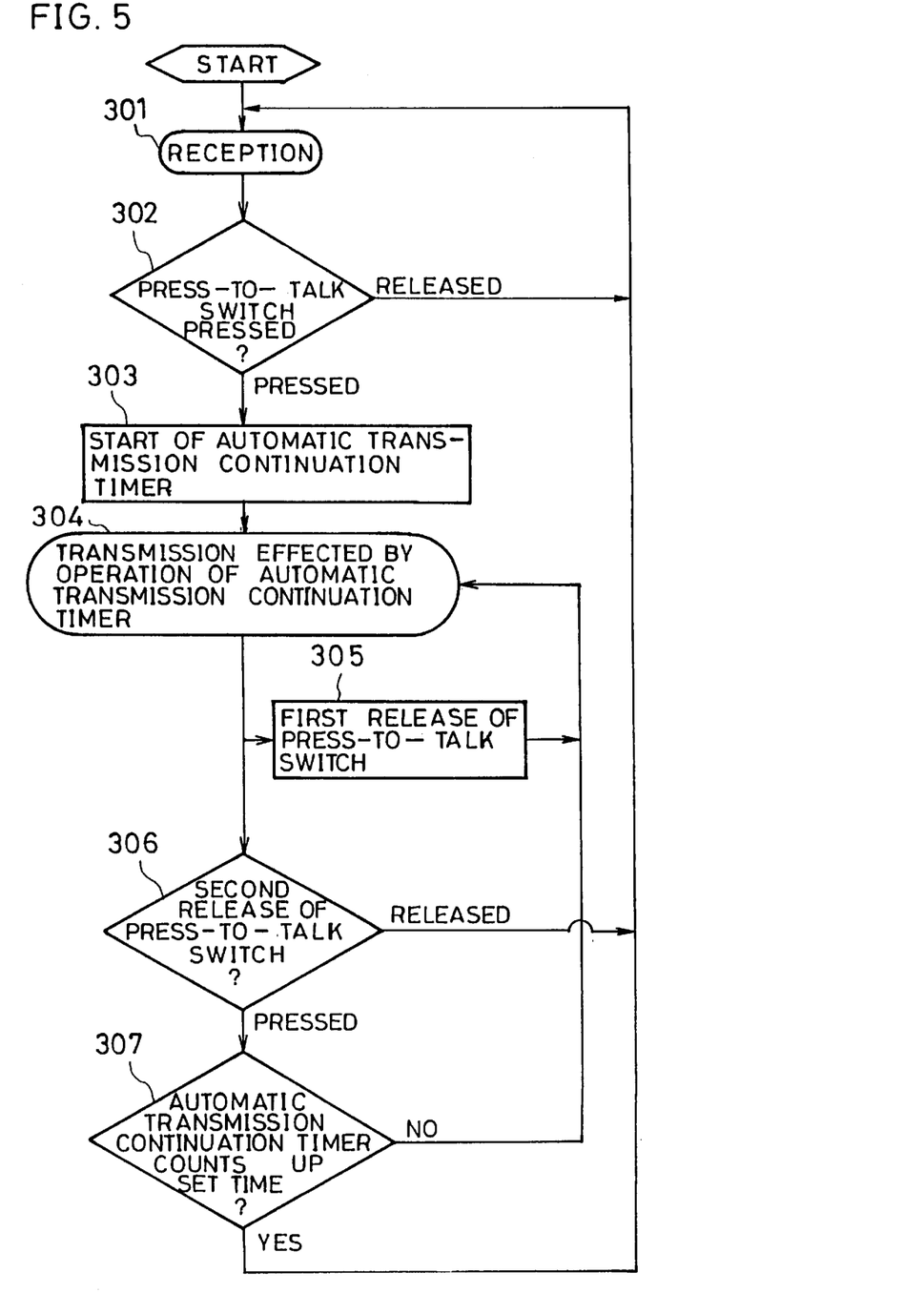
FIG. 5 is a flow chart for communication processing in Embodiment 4 of the present invention.

While transmission effected by the operation of automatic transmission continuation timer is extended by keeping pressing the press-to-talk switch 1 in the above Embodiment 3, as shown in FIG. 5, Embodiment 4 of the present invention is characterized by automatic transmission interrupting means which enables the operator to interrupt transmission effected by the operation of the automatic transmission continuation timer by the operation of the press-to-talk switch 1.

FIG. 5 is a flow chart of the processing of interrupting automatic transmission continuation by the operation relief control unit 10 in this Embodiment 4. In FIG. 5, steps 301 to 305 are the same as steps 101 to 105 in FIG. 2. When the operator presses again and releases the press-to-talk switch 1 after releasing the press-to-talk switch 1 for the first time during transmission effected by the operation of the automatic transmission continuation timer, it is judged that the press-to-talk switch 1 is released second time in step 306 and the routine proceeds to reception in step 301. When the operator does not press again or keeps pressing again the press-to-talk switch 1 after releasing the press-to-talk switch 1 for the first time during transmission effected by the operation of the automatic transmission continuation timer, the routine proceeds to reception in step 301 after the automatic transmission continuation timer counts up the set time in step 307 (the same as step 106 in FIG. 2).

According to this Embodiment 4 of the present invention, when the operator presses and releases the press-to-talk switch 1 again during transmission effected by the operation of the automatic transmission continuation timer after pressing and releasing the press-to-talk switch 1 once during transmission effected by the operation of the automatic transmission continuation timer, transmission effected by the operation of the automatic transmission continuation timer can be interrupted even before the automatic transmission continuation timer counts up the set time.

Embodiment 5

While transmission and reception are switched by the operation of the press-to-talk switch 1 during reception over a selected channel in the above Embodiments 1 to 3 of the present invention, as shown in FIG. 5, Embodiment 5 of the present invention is characterized by one-touch means which enables all the process from the selection of a channel to switching between transmission and reception to be carried out by a one-touch operation.

Figure 6:
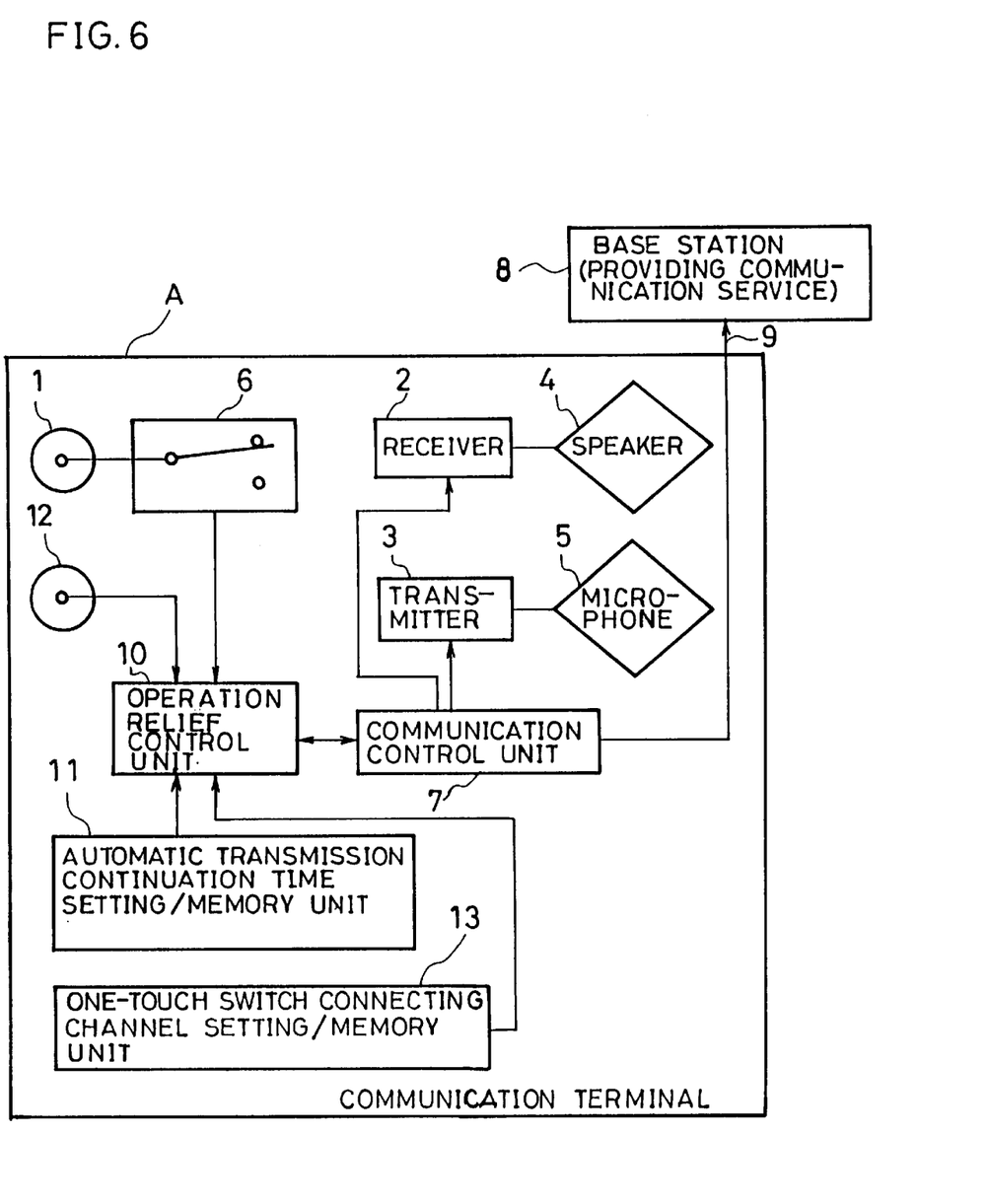
FIG. 6 is a block diagram of a communication terminal according to Embodiment 5 of the present invention.

FIG. 6 is a block diagram of a communication terminal A according to Embodiment 5 of the present invention. In FIG. 6, reference numeral 12 denotes a one-touch switch for carrying out all the process from the selection of a channel to switching between transmission and reception by a one-touch operation. Reference numeral 13 denotes a one-touch switch connecting channel setting/memory unit which enables the operator to set and store a channel number to be connected. This function is realized by using an ordinary channel number input function and scanning function.

Therefore, according to this Embodiment 5 of the present invention, by the operator's operation of the one-touch switch connecting channel setting/memory unit 13, a channel number can be set and stored in the one-touch switch connecting channel setting/memory unit 13. When the operator requests all the process from the selection of a channel to switching between transmission and reception to be carried out by a single operation, he/she presses the one-touch switch 12 in place of the press-to-talk switch 1 and informs the operation relief control unit 10 that the one-touch switch 12 has been pressed. Thereby, the operation relief control unit 10 carries out channel selection as follows. The operation relief control unit 10 reads a channel number to be connected from the one-touch switch connecting channel setting/memory unit 13 and then instructs the communication control unit 7 to set the read number. Thereby, the communication control unit 7 connects the channel of the number instructed by the operation relief control unit 10 to the base station to receive a communication service from the base station 8, and the receiver 3 outputs a voice from the base station through the speaker 4. When the operator presses the press-to-talk switch 1 in this state, the operation relief control unit 10 is switched to transmission effected by the operation of the automatic transmission continuation timer and a voice from the microphone 5 is output to the base station 8.

In short, according to this Embodiment 5 of the present invention, the communication terminal A can be operated by a single operation in place of three operations for the selection and connection of a channel and reception by pressing the one-touch switch 12.

Embodiment 6

Figure 7:
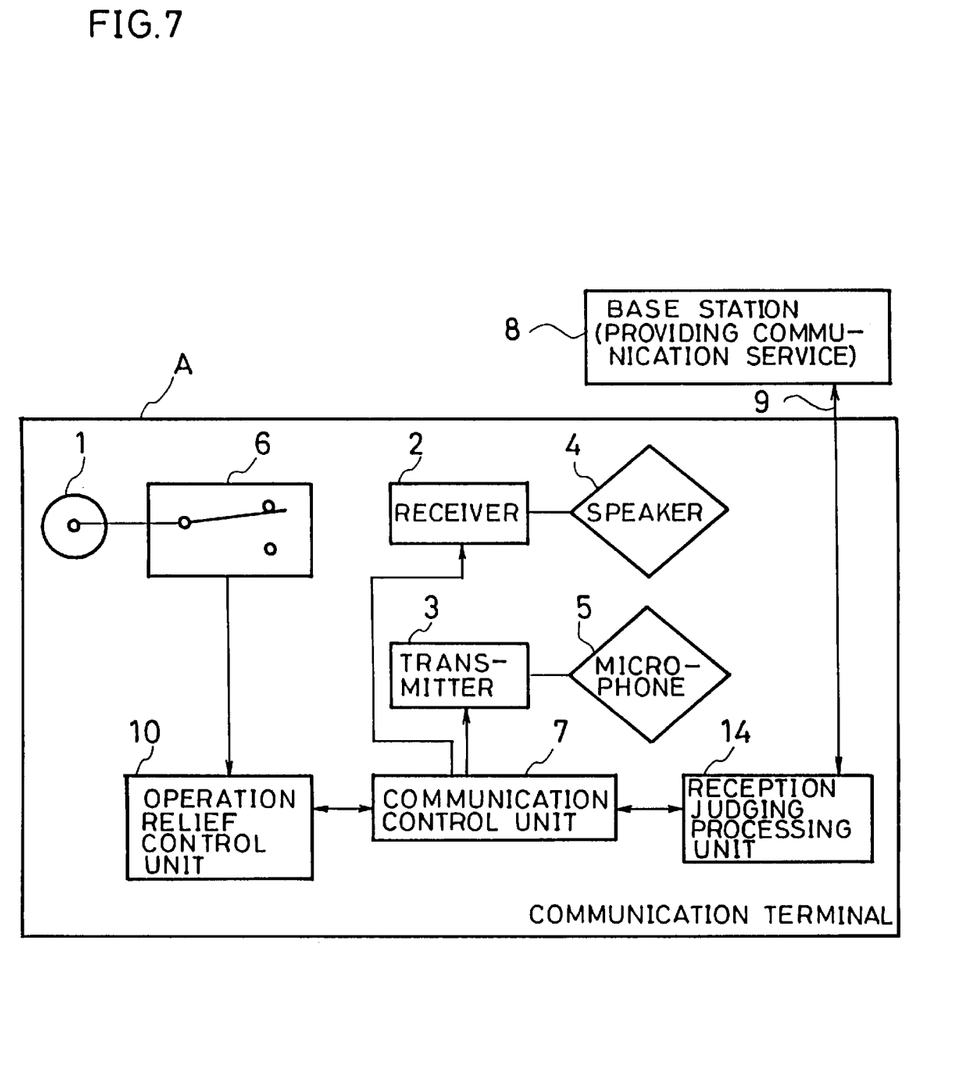
FIG. 7 is a block diagram of a communication terminal according to Embodiment 6 of the present invention.
Figure 8:
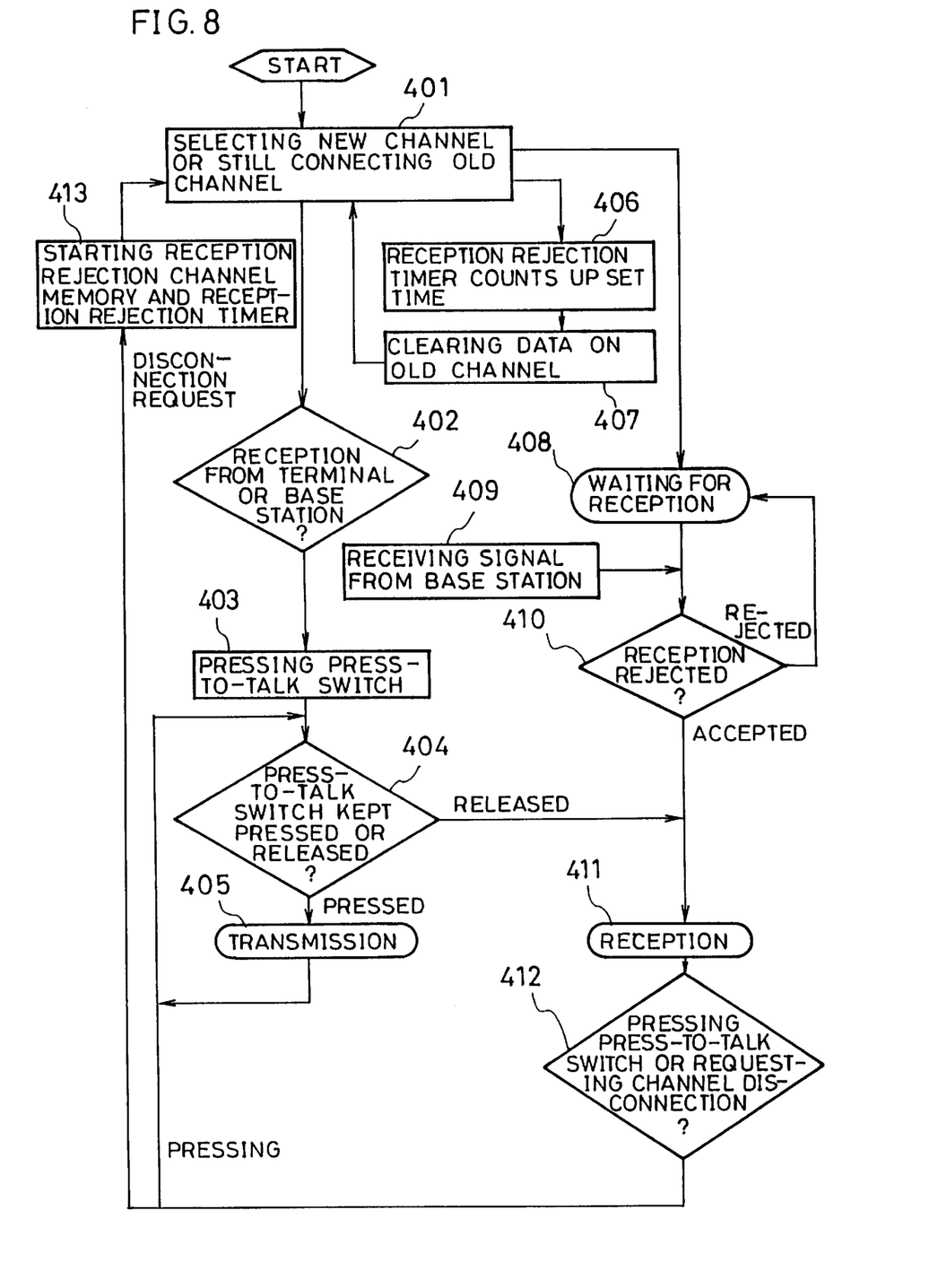
FIG. 8 is a flow chart for communication processing in Embodiment 6 of the present invention.

While all the process from the selection of a channel to switching between transmission and reception can be carried out by a one-touch operation in the above Embodiment 5 of the present invention, as shown in FIG. 7 and FIG. 8, Embodiment 8 of the present invention is characterized by the function of rejecting the unnecessary reconnection of the connected channel.

FIG. 7 is a block diagram of a communication terminal A according to this Embodiment 6 of the present invention. FIG. 8 is a flow chart for operation procedure in Embodiment 6 of the present invention.

In FIG. 7, reference numeral 14 denotes a reception judging processing unit as new channel preferential connection means for judging whether reception from the base station 8 is made effective or not, which has a reception rejection channel memory for storing a channel number in accordance with a connected channel disconnection request and a rejection time timer for counting a time during which reception from the channel of the number is rejected.

A description is subsequently given of the operation of this Embodiment 6 of the present invention with reference to FIG. 8. In step 401, the communication terminal A is connected to a channel C for reception. When the reception judging processing unit 14 receives a connected channel disconnection request, it judges that there is the channel disconnection request in step 412, stores the number of the channel C in the reception rejection channel memory in accordance with the above disconnection request and starts the rejection time timer in step 413. After this processing, the routine returns to step 401 again. The processing of storing the channel C in the reception rejection channel memory and the processing of starting the rejection time timer are carried out when the reception judging processing unit 14 receives the connected channel disconnection request from the communication control unit 7.

When a signal is received from the base station 8 over the channel C in this state, the reception judging processing unit 14 carries out the following judgment. That is, in step 410, it is judged whether the signal received over the channel C should be rejected or not. Since the reception rejection channel memory which stores the channel C and the rejection time timer are started before the reception of the above signal, the reception judging processing unit 14 abandons the signal (rejection of reception). Thereby, the communication terminal A does not interrupt the operation of selecting a new channel.

When a signal is received from the base station 8 over a channel D different from the channel C, the reception judging processing unit 14 carries out the following judgment. It is judged that the signal received over the channel D should be rejected or not in step 410. Since the signal is received over the channel D different from the channel C which is stored in the reception rejection channel memory before the reception of the signal, the reception judging processing unit 14 accepts the signal received over the channel D and normal reception processing is carried out.

The case where the reception rejection timer counts up a set time in step 406 will be described. After the timer counts up the set time, stored data on the connected channel to be rejected is cleared by the reception judging processing unit 14 in step 407. Thereafter, when a signal is received from the base station 8 over the channel C again, the reception judging processing unit 14 carries out the following judgment. That is, it is judged whether the signal received over the channel C should be rejected or not in step 410. Since a channel to be rejected is not stored in the reception rejection channel memory, the signal received over the channel C is accepted and normal reception processing is carried out.

Therefore, according to this Embodiment 6 of the present invention, since the reception rejection processing unit 14 rejects the connection of the connected channel for a predetermined time set by the reception rejection timer, the operation of selecting a new channel is not interrupted for the above predetermined time. In addition, since a signal received over a channel different from the channel stored in the reception rejection channel memory of the reception judging processing unit 14 is always accepted, the reception rate and reception performance of a channel desired by the operator are not affected.

Since the communication terminal according to the first aspect of the present invention has means for automatically continuing transmission for a predetermined time simply by pressing the press-to-talk switch once without terminating transmission by releasing the press-to-talk switch, it is not necessary to keep pressing the press-to-talk switch during transmission, thereby enhancing operation ease.

Since the communication terminal according to the second aspect of the present invention has means for setting a desired automatic transmission continuation time during which transmission can be continued without the need to keep pressing the press-to-talk switch, the automatic transmission continuation time can be changed according to press-to-talk communication application.

Since the communication terminal according to the third aspect of the present invention has means for extending the automatic transmission continuation time during which transmission can be continued without the need to keep pressing the press-to-talk switch, automatic transmission continuation within the set time is ensured and the transmission time can be freely extended without the need to reset the time. It can be used according to transmission conditions.

Since the communication terminal of the fourth aspect of the present invention has means for interrupting automatic transmission continuation which does not require the press-to-talk switch to be kept pressed, the transmission time can be shortened freely without the need to reset the automatic transmission continuation time under the condition that automatic transmission continuation within the set time can be ensured. It can be used according to transmission conditions.

Since the communication terminal of the fifth aspect of the present invention has means for carrying out all the process from the selection of a channel to switching between transmission and reception by a one-touch operation, the number of operations can be reduced. The number of connections to wrong numbers is reduced and operation ease when a frequently used channel is used is improved. Particularly, when the channel is used as an emergency channel, the operation procedure of the terminal can be simplified and the wrong operation thereof can be prevented.

Since the communication terminal of the sixth aspect of the present invention has means for selecting and connecting a new channel by rejecting the unnecessary reconnection of the connected channel, the operator's operation of selecting the new channel cannot be interrupted. The operation of disconnecting unnecessary connection can be eliminated.

What is claimed is:

1. A communication terminal comprising:
   a press-to-talk switch to be pressed by an operator for transmission of a voice signal after a desired channel is selected and connected;
   automatic transmission continuation means for continuing transmission for a set time even when the press-to-talk switch is released after it is pressed for transmission; and
   automatic transmission set time changing means capable of changing the set time of the automatic transmission continuation means.

2. The communication terminal of claim 1, further comprising:
   automatic transmission extending means for continuing transmission while the press-to-talk switch is kept pressed even after the passage of the set time of automatic transmission when the press-to-talk switch is kept pressed again during automatic transmission effected by the automatic transmission continuation means.

3. The communication terminal of claim 1, further comprising:
   automatic transmission interrupting means for interrupting the continuation of automatic transmission by pressing and releasing the press-to-talk switch again during automatic transmission effected by the automatic transmission continuation means.

4. The communication terminal of claim 1, further comprising:
   one-touch means for carrying out all processes from the selection of a desired channel to the terminal of transmission by a single operation.

5. The communication terminal of claim 1, further comprising:
   new channel preferential connection means for selecting and connecting a new channel by rejecting reception over an old channel for a predetermined time when the new channel is to be selected and connected after the disconnection of the old channel.

* * * * *